Patented Dec. 28, 1948

UNITED STATES PATENT OFFICE 2,457,371

ACYLATED p-AMINOBENZENE SULFONAMIDES

Rudolf Hirt, Riehen, and Hans Gysin and Henry Martin, Basel, Switzerland, assignors to J. R. Geigy A. G., Basel, Switzerland, a Swiss firm No Drawing. Application March 10, 1945, Serial No. 582,182. In Switzerland November 5, 1943

6 Claims. (Cl. 260—397.7)

It has been found that especially valuable acylated p-aminobenzene sulfonamides of the general formula

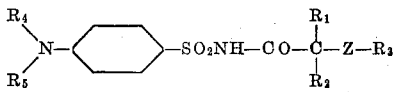

wherein $R_1$ and $R_2$ mean hydrogen, the same or different alkyl, cycloalkyl, aralkyl or aryl radicals,
$R_3$ means alkyl, cycloalkyl, aralkyl, aryl or heterocyclic radicals,
$R_4$ means hydrogen, alkyl or aralkyl radicals,
$R_5$ means hydrogen or an alkyl radical and
Z means S or O, are obtained, when sulfonamides of the benzene series containing in p-position to the sulfonamido group a nitrogen-containing group which, if desired, is convertible into the amino group are caused to react with carboxylic acids of the general formula

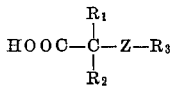

wherein $R_1$ to $R_3$ and Z have the above-mentioned meanings, or with their functional derivatives and when, if desired, the p-positioned nitrogen-containing group is converted into a free amino group or into an amino group substituted in a desired manner. Compounds of this kind have not become known heretofore; the same differ from the known acylated p-aminobenzene sulfonamides by their improved efficacy against infection promoters and by their lower toxicity.

As sulfonamides of the benzene series containing a nitrogen-containing group in p-position to the sulfonamide group may be mentioned p-aminobenzene sulfonamide, alkyl-, aralkyl-aminobenzene sulfonamides, p-acylaminobenzene-sulfonamide, p-nitrobenzene sulfonamide and the like. Instead of the nitro group, any other group can be present which may be converted by reduction into the amino group, such as the nitroso, azo, azoxy or hydrazo group. Also azomethine and acylamino groups, ureides, urethanes and aminoalkyl sulfonic acids may be converted into amino groups by hydrolysis. Advantageously such acyl radicals are selected which can easily again be split off. As such radicals come into consideration for instance the acetyl or the carbomethoxy radical which are readily split off by a hydrolytical treatment without changing the acylated sulfonamide group by this procedure.

The same products are also obtained by interaction of corresponding α-halogen carboxylic acid derivatives or α-sulfonic acid ester carboxylic acid derivatives with the corresponding sulfonamides and by a subsequent interaction with alcohols, phenols, mercaptans or their salts.

A special modification of the present process leading to the same products consists in that benzene sulfone halides containing a nitrogen-containing group in p-position are condensed with salts of amides of the general formula

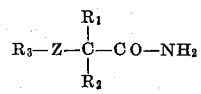

wherein $R_1$ to $R_3$ and Z correspond to the aforesaid meanings, and that, if necessary, the p-positioned group is converted into an amino group or into a nitrogen-containing group substituted in the desired manner.

As carboxylic acids of the formula

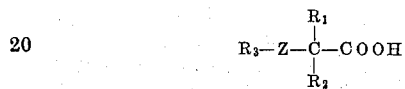

may be enumerated for example: methoxy-, ethoxy-, propoxy-, isopropoxy-, allyloxy-, butoxy-, isobutoxy-, pentoxy-, hexoxy-, heptoxy-, octoxy-, nonoxy-, decoxy- etc. -acetic acid, α-methoxy-, α-ethoxy-, α-propoxy-, α-butoxy-, α-isobutoxy-, α-hexoxy-, α-octoxy-, α-undecoxy- etc. -propionic acid, α-methoxy-, α-ethoxy-, α-propoxy-, α-isopropoxy-, α-butoxy- etc. -butyric acid, α-methoxy-, α-ethoxy, α-propoxy-, α butoxy- etc. -isobutyric acid, α-methoxy-, α-ethoxy, α-butoxy-, etc. -valeric acid, α-methoxy-, α-ethoxy-, α-propoxy- etc. -isovaleric acid; moreover, corresponding capronic, oenanthylic, caprylic acids and so on; cyclopentyloxy-, cyclopentenyloxy-, methylcyclopentyloxy-, cyclohexyloxy-, cyclohexenyloxy-, cycloheptyloxy-acetic acid etc., α-cyclopentyloxy-, α-cyclohexyloxy-propionic acid etc., α-cyclopentyloxy-, α-cyclopentenyloxy-, α-cyclohexyloxy-butyric acid etc., cyclohexylethoxy-, (p-methylcyclohexyl)-ethoxy-acetic acid, etc., benzyloxy-, 4-methylbenzyloxy-, 2-methylbenzyloxy-, 3-methylbenzyloxy-, 3:4-dimethylbenzyloxy-, phenethoxy-, γ-phenylpropoxy-, cinnamyloxy-, p-methyl-cinnamyloxy-acetic acid etc., α-benzyloxy-, α-(3:4-dimethylbenzyloxy)-, α-(β'-phenethoxy), α-cinnamyloxy - propionic acid, furthermore, corresponding butyric, valeric acids etc., (α-methylbenzyloxy)-, (4:α-dimethylbenzyloxy)-acetic acid, α-(α'-methylbenzyloxy)-propionic acid etc., phenoxy-, 4-methylphenoxy-, 3-methylphenoxy-, 2-methylphenoxy-, 3:4-dimethylphenoxy-, 4-amylphenoxy-, 4-methoxyphenoxy-, 4-chlorophenoxy-acetic acid, α-phenoxy-, α-(4-methylphenoxy)-, α-(3:4-dimethylphenoxy)-, α-(2-methoxyphenoxy) - propionic acid etc., α-phenoxy-, α-(3-cresoxy)-, -thymoxy-, α-carvacroxy-, α-(4-methyl-3-methoxyphenoxy)-butyric acid etc., α-phenoxy-, α-(p- cresoxy)-, α-(3:4-xylenoxy)- valeric acid etc., α-phenoxy-, α-(3-chlorophenoxy)-, α-(2-cresoxy)-isovaleric acid etc. Corresponding derivatives of capronic, oenanthylic, caprylic acid etc., may also be used.

Phenoxy-cyclopentyl-acetic acid, m-cresoxy-cyclopentyl-acetic acid, phenoxy - cyclohexyl-acetic acid etc., diphenyloxy-, tolylphenyloxy-acetic acid, etc., α-naphthoxy-, β-naphthoxy-acetic acid etc., o-phenylphenoxy-acetic acid etc., may also be used.

Corresponding thioether acids, such as methylmercapto-, ethylmercapto-, propylmercapto-acetic acid etc., α-ethylmercapto, α-propylmercapto-propionic acid etc., α-ethylmercapto-, α-isopropylmercapto-, α-butyl-mercapto-, α-pentylmercapto-butyric acid etc., analogous isobutyric, valeric, isovaleric, capronic, oenanthylic capyrlic acids etc., cyclopentylmercapto-, cyclopentenylmercapto-acetic acid and other corresponding mercapto acids, as defined above as ether acids, may be used. Araliphatic acids: benzylmercapto-, β-phenethylmercapto-acetic acid, corresponding propionic-, butyric acids etc. Among the aromatic acids which may be employed may be cited for instance: phenmercapto-, 4-methylphenmercapto-acetic acid etc. Heterocyclic acids which may be employed are for example furfuryloxy-, 2'-pyridinoxy-, 6'-quinolinoxy-, 7-cumarinoxy-, 2-quinoxalinoxy-acetic acid etc., α-furfuryloxy-, α-(2'-pyridinoxy)-, α-(3'-pyridinoxy)-, α-(4'-pyridinoxy)-propionic acid etc. Besides substituted aliphatic oxy acids may be used, e. g. cyclopentyl-methoxy-, cyclohexyl - ethoxy - acetic acid, methoxy-dicyclopentenyl-acetic acid, methoxy-cinnamyl-, propoxy-benzyl-acetic acid etc., methoxy-phenyl-, ethoxy-tolyl-acetic acid, then the corresponding propionic-, butyric acids etc.

The acids mentioned above are partly known; where this is not the case, the same can be prepared according to known methods.

The acids can be used as such for instance in the presence of catalysts or in form of their functional derivatives; besides it is also possible to concomitantly use acid binding or condensing agents.

As nitrogen-containing group may be enumerated the nitro, amino, acylamino, ureido, urethano, aminoalkylene sulfonic acid, alkylamino or aralkylamino group and the like.

The present invention will now be illustrated, but no limited, by the following examples, the parts being by weight.

*Example 1*

30 parts of α-ethoxy butyric acid chloride are dissolved in 100 parts of pyridine with cooling and stirring. Then 40 parts of p-nitrobenzene sulfonamide are added by portions and the whole is stirred for some time at 60°–70° C. Then the mixture is poured onto ice and hydrochloric acid and the resin being thus separated is isolated. The nitro body is reduced according to Béchamp by means of iron and hydrochloric acid without a further purification. The reduction mixture is subsequently made alkaline with sodium carbonate, filtered by suction and the 4-aminobenzene sulfone-(α'-ethoxybutyroyl)- amide of the formula

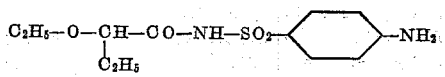

is precipitated from the filtrate by means of acetic acid. By recrystallization from alcohol the compound is obtained in pure form. Melting point 130° C.

In a completely analogous manner the following compounds may be produced:

4-aminobenzene sulfone-(α' - butoxypropionyl)-amide, M. P. 148° C.

4 - aminobenzene sulfone - (α' - isobutoxypropionyl) -amide, M. P. 146° C.

4-aminobenzene sulfone-(α' - butoxybutyroyl)-amide, M. P. 105° C.

4-aminobenzene sulfone-(α'-isobutoxybutyroyl)-amide, M. P. 130° C.

4-aminobenzene sulfone-(α' - methoxyisobutyroyl)-amide, M. P. 158° C.

4-aminobenzene sulfone-(α'-ethoxyisobutyroyl)-amide, M. P. 138° C.

4-aminobenzene sulfone-(α' - propoxyisobutyroyl)-amide, M. P. 135°–136° C.

4-aminobenbene sulfone-(methoxyacetyl)-amide, M. P. 210° C.

4-aminobenzene sulfone-(ethoxyacetyl) - amide, 178° C.

4 - aminobenzene sulfone - (isopropoxyacetyl)-amide, M. P. 170° C.

4-aminobenzene sulfone-(propoxyacetyl)-amide, M. P. 124° C.

4 - aminobenzene sulfone - (isobutoxyacetyl)-amide, M. P. 137° C.

4-aminobenzene sulfone-(α' - ethoxypropionyl)-amide, M. P. 130° C.

4-aminobenzene sulfone-(α'-propoxypropionyl)-amide, M. P. 140° C.

4-aminobenzene sulfone - (α' - isopropoxypropionyl) -amide, M. P. 150° C.

4-aminobenzene sulfone-(α' - propoxybutyroyl)-amide, M. P. 118° C.

*Example 2*

30 parts of p-nitrobenzene sulfonamide are suspended in 100 parts of chlorobenzene, then 16 parts of α-propylmercaptopropionic acid chloride are dropped thereto and the mixture is boiled under reflux for some hours. After complete reaction the chlorobenzene is distilled with steam, the residue is dissolved in a sodium carbonate solution, treated with animal charcoal, filtered and the 4-nitrobenzene sulfone-(α'-propylmercaptopropionyl)-amide is precipitated from the filtrate by means of hydrochloric acid. By reduction the nitro body gives the corresponding amine of the formula

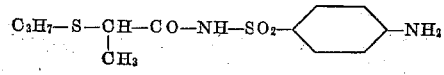

which, when recrystallised from alcohol, melts at 158° C.

In an analogous manner may be obtained:

4-aminobenzene sulfone-(ethylmercaptoacetyl)-amide, M. P. 176°–178° C.

4 - aminobenzene sulfone - (propylmercapto - acetyl)-amide, M. P. 168° C.

*Example 3*

21.4 parts of p-acetylaminobenzene sulfonamide, 14.4 parts of cyclopentyloxy acetic acid and 20 parts of phosphorus pentoxide are treated with 150 parts of chlorobenzene and the mixture is boiled under reflux for several hours. The chlorobenzene is subsequently distilled off, the residue dissolved in a sodium carbonate solution, the solution treated with animal charcoal, filtered and the filtrate is acidified by means of hydrochloric acid. By saponification of this solution with caustic soda lye the 4-aminobenzene sulfone-(cyclopentyloxyacetyl)-amide of the formula

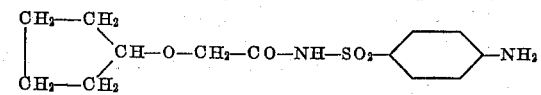

is easily obtained.

In an analogous manner may be produced the 4-aminobenzene sulfone-(cyclohexoxypropionyl)-amide, melting at 170° C.

Example 4

36.5 parts of 4-nitrobenzene sulfone-(α-bromoisovaleroyl)-amide are added to 11.6 parts of sodium phenolate suspended in 250 parts of absolute xylene and then, while stirring, heated to boiling for several hours. After completion of the interaction the xylene is removed by steam, the residue is dissolved in a sodium carbonate solution, then residual small quantities of unconsumed sulfonamide are filtered off and, from the filtrate, the 4-nitrobenzene sulfone-(α-phenoxyisovaleroyl)-amide is precipitated by means of acetic acid. By reduction of the resulting compound the corresponding amino compound of the formula

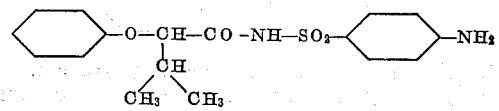

is obtained, which is purified by recrystallisation from alcohol.

According to the same method or according to the process described in the Examples 1 to 3 the following compounds can be made:

4 - aminobenzene sulfone - (phenoxyacetyl) - amide, M. P. 140° C.
4-aminobenzene sulfone-(4' - methylphenoxyacetyl)-amide, M. P. 148° C.
4-aminobenzene sulfone - (2' - methylphenoxyacetyl)-amide, M. P. 218° C.
4-aminobenzene sulfone - (3' - methylphenoxyacetyl)-amide, M. P. 180° C.
4-aminobenzene sulfone-(2':5' - dimethylphenoxyacetyl)-amide, M. P. 205° C.
4 - aminobenzene sulfone - (4' - ethylphenoxyacetyl)-amide, M. P. 155° C.
4-aminobenzene sulfone-(2'-isopropyl-5'-methylphenoxyacetyl)-amide, M. P. 192° C.
4 - aminobenzene sulfone - (4' - butylphenoxyacetyl)-amide, M. P. 128°-130° C.
4-aminobenzene sulfone-(4' - isoamylphenoxyacetyl)-amide, M. P. 194° C.
4 - aminobenzene sulfone - (4' - hexylphenoxyacetyl)-amide, M. P. 125°-126° C.
4 - aminobenzene sulfone - (4' - chlorophenoxyacetyl)-amide, M. P. 185°-186° C.
4-aminobenzene sulfone - (4-tertiary butylphenoxyacetyl)-amide, M. P. 193°-194° C.
4 - aminobenzene sulfone - (β - naphthyloxyacetyl)-amide, M. P. 207° C.
4-aminobenzene sulfone-(α-naphthyloxy-acetyl)-amide, M. P. 245° C.
4 - aminobenzene sulfone-(4'-phenethylphenoxyacetyl)-amide, M. P. 180° C.
4-aminobenzene sulfone-(4' - isobutylphenoxyacetyl)-amide, M. P. 140° C.
4 - aminobenzene sulfone - (phenylmercaptoacetyl)-amide, M. P. 149° C.
4-aminobenzene sulfone-(4' - methylphenylmercaptoacetyl)-amide, M. P. 166° C.
4-aminobenzene sulfone-(4' - chlorophenylmercaptoacetyl)-amide, M. P. 141°-142° C.
4 - aminobenzene sulfone - (2' - methoxy - 4'-chlorophenylmercaptoacetyl) - amide, M. P. 144°-145° C.
4 - aminobenzene sulfone - (3':4' - dimethyl - phenylmercaptobutyroyl) - amide, M. P. 223°-225° C.
4 - aminobenzene sulfone - (α' - phenoxypropionyl)-amide, M. P. 148° C.
4 - aminobenzene sulfone - (α' - phenoxyisobutyroyl)-amide, M. P. 182° C.
4 - aminobenzene sulfone - (α' - phenoxyvaleroyl)-amide, M. P. 158° C.
4-aminobenzene sulfone-(α' - phenoxycaproyl)-amide, M. P. 115° C.
4 - aminobenzene sulfone - (α' - phenoxyisocaproyl)-amide, M. P. 127°-130° C.
4 - aminobenzene sulfone - (α' - 3':5'-dimethylphenoxyisovaleroyl)-amide, M. P. 133°-134° C.
4 - aminobenzene sulfone - (α' - phenoxyisovaleroyl)-amide, M. P. 181° C.

Example 5

In a round bottomed flask 36 parts of 4-nitrobenzene sulfone chloracetamide are dissolved in the calculated quantity of dilute caustic soda lye. Then at room temperature a solution of 23 parts of 4-chloro-2-methoxybenzylmercaptan in caustic soda lye is added thereto, whereby the temperature rises to 30°-35° C. The mixture is stirred for some hours at this temperature, filtered by suction and, from the filtrate, the nitro body is precipitated by means of hydrochloric acid. When recrystallised from dilute alcohol, the nitro body melts at 125° C. By reduction with iron and hydrochloric acid the 4-aminobenzene sulfone-(4'-chloro-2' - methoxybenzylmercaptoacetyl)-amide of the formula

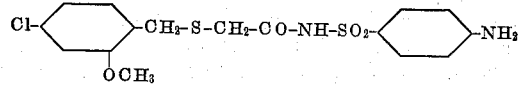

is produced, the same being obtained, when recrystallised from dilute alcohol, in form of yellowish leaflets melting at 144° C.

The reaction scheme for the aforedescribed reaction may be represented as follows:

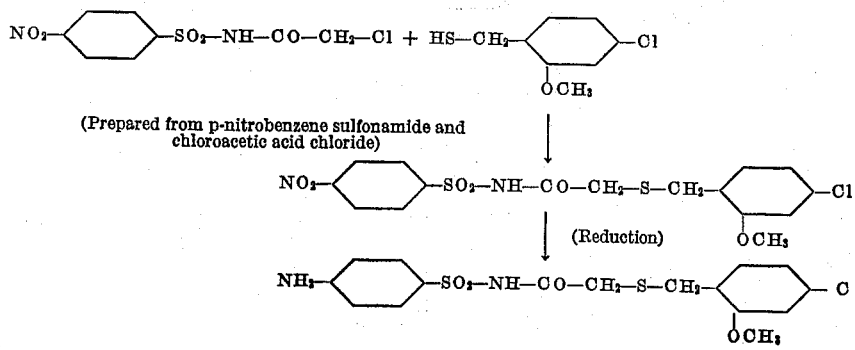

(Prepared from p-nitrobenzene sulfonamide and chloroacetic acid chloride)

Instead of 4-nitrobenbene sulfone chloracetamide, the analogous compound containing the sulfomethyl group instead of the chlorine atom can be used.

In an analogous manner may be prepared:

4 - aminobenzene sulfone - (4' - methoxybenzylmercaptoacetyl) -amide, M. P. 110° C.

4 - aminobenzene sulfone - (4' - chlorobenzylmercaptoacetyl) -amide, M. P. 107°-108° C.

4-aminobenzene sulfone - (2-methoxy-5'-chlorobenzylmercaptoacetyl) -amide, M. P. 144° C.

Example 6

22.4 parts of the sodium salt of p-nitrobenzene sulfonamide are suspended in 150 parts of nitrobenzene and treated with 22 parts of 8-quinolyloxyacetyl chloride, the temperature rising thus to 50° C. Now, the whole is heated for some hours to 50°-60° C. Then the mixture is introduced under stirring into a dilute sodium carbonate solution, the small quantities of unchanged sulfonamide are filtered off and, from the filtrate, the 4-nitrobenzene sulfone-(8-quinolyloxyaceto)-amide is precipitated with acid. By reduction according to Béchamp the corresponding amino compound of the formula

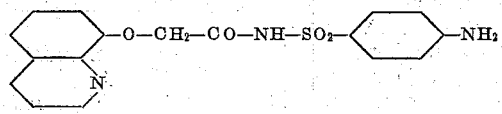

is obtained, the same being purified by recrystallisation.

Example 7

24.4 parts of 4-carbethoxy aminobenzene sulfonamide in chlorobenzene are treated with 22.5 parts of a-cinnamylovypropionyl chloride and with 2 parts of copper powder and the mixture is heated to boiling for some hours. Then the chlorobenzene is distilled off with steam, the residue dissolved in a sodium carbonate solution, filtered and the filtrate is treated with hydrochloric acid. The carbethoxy compound is saponified with dilute caustic soda lye and the resulting 4 - aminobenzene sulfone - a - cinnamyloxypropionyl) -amide of the formula

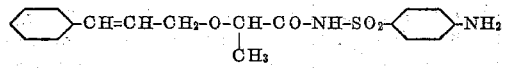

purified by recrystallisation from alcohol.

Of course, all the acids and their radicals enumerated in the introductory part of this specification can be introduced into the sulfamide molecules according to the methods illustrated in the above examples.

What we claim is:

1. An acylated p-aminobenzene sulfonamide of the formula

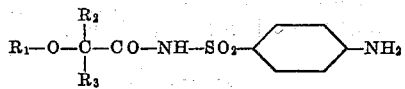

wherein $R_1$ and $R_3$ each represents a lower alkyl radical and $R_2$ represents a member selected from the group consisting of hydrogen and a lower alkyl radical.

2. An acylated p-aminobenzene sulfonamide of the formula

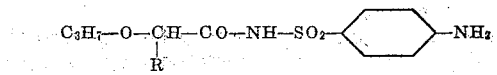

wherein R represents a lower alkyl radical.

3. The acylated p-aminobenzene sulfonamide of the formula

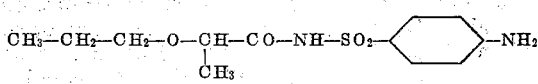

4. The acylated p-aminobenzene sulfonamide of the formula

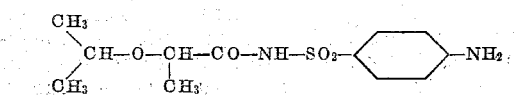

5. An acylated p-aminobenzene sulfonamide of the formula

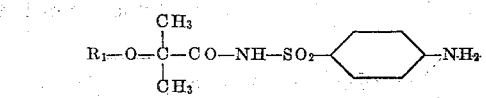

wherein $R_1$ represents a lower alkyl radical.

6. The acylated p-aminobenzene sulfonamide of the formula

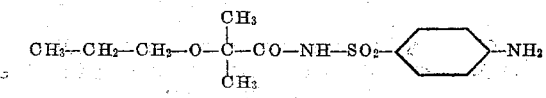

RUDOLF HIRT.
HANS GYSIN.
HENRY MARTIN.

REFERENCES CITED

The following references are of record in the file of this patent:

UNITED STATES PATENTS

| Number | Name | Date |
| --- | --- | --- |
| 2,289,029 | Mietzsch et al. | July 7, 1942 |
| 2,408,066 | Hentrich et al. | Sept. 24, 1946 |

FOREIGN PATENTS

| Number | Country | Date |
| --- | --- | --- |
| 111,230 | Australia | Aug. 22, 1940 |
| 538,822 | Great Britain | Aug. 18, 1941 |

OTHER REFERENCES

Chemical Reviews, August, 1940, pages 113, 114, 156-159.